3,139,347
METHOD OF CURING MEAT
Louis Sair, Evergreen Park, Ill., and William Patrick Donahoo, East Orange, N.J., assignors to The Griffith Laboratories, Inc., Chicago, Ill., a corporation of Illinois
Filed Apr. 22, 1963, Ser. No. 274,525
8 Claims. (Cl. 99—159)

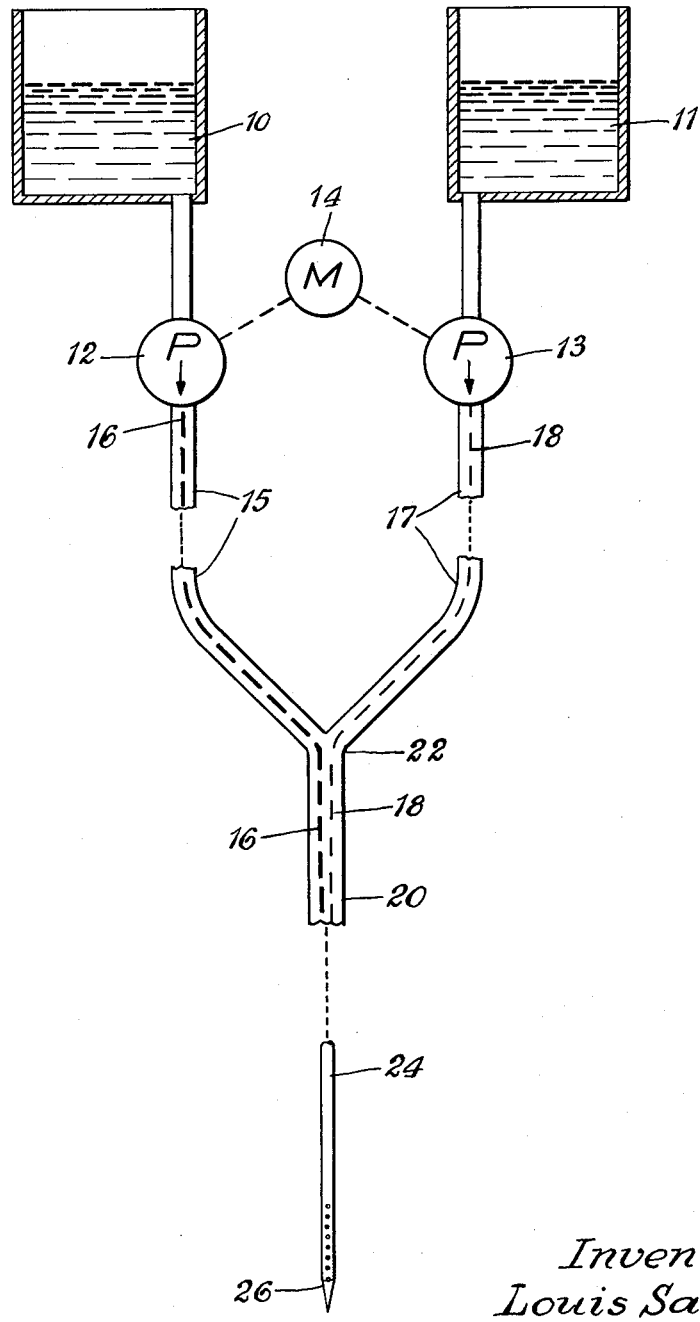

The present invention relates to processing meat by introducing aqueously dissolved treating agents into the meat.

Arterial pumping and injection of curing salt solution or pickle into meat are well known. It is also known that when certain salts of an acid of phosphorus are included, the water-binding capacity of the meat is increased, and in cooking such treated meat there is less shrinkage of the meat with attendant purging of juices. It is also known that the phosphate salts so function in the presence or absence of curing salt.

In actual practice, the selections of the phosphate salt are limited by the solubility characteristics of the salt in the pickle, the sodium chloride content of which in part contributes to limiting the solubility of certain ones of the effective phosphate salts in a pickle. As a consequence, the readily soluble sodium tripolyphosphate, sodium hexametaphosphate, and certain glassy phosphates have been widely used in curing salt brines, as set forth in Hall U.S. No. 2,513,094.

It is now known that the effectiveness of the phosphate salts involves the alkali reserve which elevates the pH of the meat toward 7. Tetrasodium pyrophosphate is more effective weight for weight than sodium tripolyphosphate with respect to water-binding power, but its limited solubility does not permit dissolving a desired effective quantity of it in a sodium chloride brine to be introduced into meat.

Tetrasodium pyrophosphate, aside from its poor solubility, is objectionable to packers who use brines made of certain commercial grades of sodium chloride. Such grades contain mineral impurities, especially calcium ions. These impurities react with the tetrasodium pyrophosphate and form precipitates which settle as a sludge in the bottom of storage tanks. To illustrate, a common brine supply is one designated 99° salinometer, containing 176 parts of sodium chloride, 496 parts of water, and 2000 parts per million of calcium ions.

The present invention provides for the functioning in brine-treated meat of a tetra salt of alkali-metal and pyrophosphoric acid as the sole phosphate salt or in combination with a different effective salt of an acid of phosphorus.

The poor solubility of tetrasodium pyrophosphate is exemplary of a problem in compounding pickle liquors. Ingredients which are suitable to function are not all sufficiently soluble for producing a single pickle liquor of desired concentration. However, it is possible to produce the complete pickle liquor by combining two or more solutions substantially at the time of introducing the combined liquors into the meat, the combination effecting a reaction between separately dissolved ingredients to produce a functioning component of the pickle.

It is, therefore, the general object of the invention to prepare at least two separate stable solutions in which all the substance for an alkaline pickle liquor is dissolved, in which are separately dissolved reactive materials which on combining the solutions interact to produce a desired functioning ingredient of the pickle liquor.

It is another object of the invention to produce tetrasodium pyrophosphate substantially at the time that a pickle enters the meat.

It is a particular object of the invention to provide at least two solutions which when mixed produce such tetra salt of pyrophosphoric acid, and to mix the solutions substantially at the time of pumping or injecting the meat.

It is a further object of the invention to provide in one solution an acid alkali-metal salt of pyrophosphoric acid, such as sodium acid pyrophosphate, and in another solution a compound of alkali-metal having available alkali which will react with the acid salt of pyrophosphoric acid to form the desired tetra-salt, and to mix the solutions in proportion to convert all, substantially all, or less than all of the acid salt to the tetra-salt.

Various other and ancillary objects and advantages of the invention will appear hereinafter.

In forming cured meats, it is now a practice to introduce into the meat a pickle containing sodium chloride, sodium nitrite, sodium nitrate and an isomer of ascorbic acid, the latter as a salt, preferably sodium erythrobate. An ascorbic salt is used rather than the free acid, because in solution, a nitrite salt and a free isomer of ascorbic acid are incompatible.

Other incompatible combinations are recognized for the present invention. One such is a dissolved combination of a strong alkali, such as alkali-metal hydroxide or sodium carbonate, and sodium erythrobate in which mixture the strong alkalinity gradually destroys the sodium erythrobate.

Another incompatible combination is also recognized. A dissolved combination of an acid salt of pyrophosphoric acid and of a nitrite salt results in liberation of nitrous acid. Accordingly, in the present invention, the nitrite salt is in one solution and the acid salt of pyrophosphoric acid is in another solution. In consequence, a pickle containing incompatible combinations may not be prepared and held in storage for use.

Although alkali-metal hydroxide is preferred as the alkali to convert, for example, sodium acid pyrophosphate to tetrasodium pyrophosphate, the invention is not so limited. Hydroxides, normal orthophosphates, carbonates and bicarbonates of alkali-metal, or mixtures thereof, may be employed. The use of a carbonate or a hydroxide of sodium results in alkaline phosphate salt which is tetrasodium pyrophosphate.

Since mixtures of alkaline phosphate salts may be used, such a mixture can be produced by using as the alkaline reagent the normal salt of alkali-metal and orthophosphoric acid. Such salt, for example, $Na_3PO_4$ dissolved in water exists therein as a mixture of NaOH and $Na_2HPO_4$. Accordingly, such normal orthophosphate salt may be used to supply not only alkali to form tetrasodium pyrophosphate, but also to provide disodium orthophosphate, which is a well-known alkaline phosphate salt for increasing water-binding power and for minimizing purging.

It is known variously to mix the alkaline salts of acids of phosphorus in processing meat, and such mixtures are dictated by numerous considerations including solubilities in brines, and including the desired concentrations. It is known to mix sodium acid pyrophosphate and tetrasodium pyrophosphate, the mixture being predicated more on solubilities than on functions in the meat.

The present invention contemplates for functioning in the meat, not only the tetra salt of pyrophosphoric acid as a sole salt of an acid of phosphorus, but also mixtures of it with other effective salts or other effective alkaline materials which may be other alkaline salts of phosphoric acids. In using an alkali-metal hydroxide or carbonate to react with an acid pyrophosphate salt, incomplete neutralization may be practiced, thereby to provide a mixture of acid pyrophosphate salt and the tetra salt. By using tri-alkali-metal orthophosphate salt in sufficient quantity fully to neutralize the acid pyrophosphate salt, there is formed a mixture of the tetra salt and di-alkalimetal orthophosphate salt. By using only sufficient tri-alkali-metal orthophosphate salt, for example, trisodium phosphate, to neutralize but a portion of the sodium acid pyrophosphate, there results a mixture of disodium orthophosphate, sodium acid pyrophosphate and tetrasodium pyrophosphate. By using an excess of the neutralizing alkali, the excess remains as alkali. Thus, an excess of trisodium phosphate over a neutralizing amount for sodium acid pyrophosphate yields a liquid having disodium phosphate, trisodium phosphate and tetrasodium pyrophosphate.

In practicing the invention, it is preferred to neutralize upwardly from 90% of the acid pyrophosphate salt to all of it, even to the extent of having an excess of the neutralizing alkali.

Agents other than the phosphate salts and sodium chloride are commonly used in pickle brines, for example, an isomer of ascorbic acid or its salt, sodium nitrite, sodium nitrate, sugar and dextrose. When two solutions are used for the present invention, they can be variously compounded, considering the following two groups of mutually compatible agents.

(A)
Sodium chloride
Alkali-metal acid pyrophosphate
Alkali-metal nitrate
A free isomer of ascorbic acid
Water-soluble salt of an isomer of ascorbic acid
Cane sugar
Dextrose (B)
Sodium chloride
Alkali-metal hydroxide or carbonate or bicarbonate or normal orthophosphate
Alkali-metal nitrite
Alkali-metal nitrate
Cane sugar
Dextrose It is noted that sodium chloride, alkali-metal nitrate, cane sugar and dextrose are common to the lists (A) and (B) above. Accordingly, for the final pickle to function in the meat, one or more of the common ingredients may be used in any one solution as indicated, or be divided with portions in each solution. Conventionally, the nitrite and nitrate salts are present together in a single composition so it is preferred practice to have them in one solution with the alkali-yielding agent.

In the solution containing the acid pyrophosphate salt, the ascorbic value is stable as the free acid or as its water-soluble salt. When the water-soluble salt of the isomer of ascorbic acid is present in the solution with the acid pyrophosphate salt, there will result an equilibrium reaction between the two, which is of no significance when the separate solutions are mixed. When the ascorbic material is provided as its salt, none of the alkali supplied by the other solution is taken up by it on mixing the two solutions. Thus, it is simpler to compound and to proportion the two solutions on mixing by using the ascorbic material as its salt.

When sodium acid pyrophosphate is used with sodium chloride, the proportions of water and of the acid pyrophosphate salt must be such as to permit complete dissolution of the salt at the storage temperature.

In neutralizing the acid pyrophosphate salt, it is preferred not fully to neutralize it. When 222 parts by weight of $Na_2H_2P_2O_7$ (M.W.=222) are neutralized with 70 parts by weight of NaOH (M.W.=40) the pH is elevated from 4 to 8.7. When 80 parts of NaOH are used, which fully neutralize to form tetrasodium pyrophosphate, the pH is elevated to 11. Since an excess of neutralizing alkali contributes the desired function of elevating the pH of the meat, the invention is not limited to exact proportioning of the two solutions. However, predetermined proportioning is preferred to practice incomplete neutralization in proportioning the two solutions.

From the foregoing it was found that two solutions which together make a pickle liquor, can be combined to produce the tetrasodium pyrophosphate. Thus, two such liquors may be combined at the inlet end of a single-orifice injection needle, or even in a conduit ahead of said inlet. Since needles are idle for short periods between use on large quantities of meat bodies such as hams, the liquor standing in the conduit is not functionally impaired. Accordingly, the path traveled after combination is preferably made as short as practicable to form the said tetra salt substantially at the time of introducing the two solutions. By the use of injection needles with two passageways therethrough, or double needles, no destruction can occur. In single-passage-needles, the union is preferably effected in a conduit or manifold shortly before reaching the needles, or at the entrance to the needle. The passage for the combined liquids in the conduit or needle should be small to limit a combined volume which may be stagnant.

The drawing illustrates diagrammatically the proportioning and the combining of two liquors.

Numerals 10 and 11 illustrate, respectively, separate supplies of the two liquors from which supplies the liquors are drawn to proportioning pumps P at 12 and 13 operated in synchronism as indicated by a common motive source M at 14. Pump 12 delivers into conduit 15 successive increments 16 of liquor from supply 10. These increments are illustrated by relatively long and heavy lines.

Pump 13 delivers into conduit 17 successive increments 18 from supply 11. The increments 18 are illustrated by lines which are shorter and lighter than the lines indicating increments 16, thus to indicate that the content of increments 16 is greater than the content of the increments 18.

The proportioning pumps 12 and 13 are standard commercial items which may be operated so that the increments 16 alternate in succession with increments 18. They also may be operated so that the alternating increments 16 and 18 overlap to predetermined extents.

Conduits 15 and 17 are illustrated as combining their contents in a conduit 20 in which the increments 16 are illustrated as overlapping with the increments 18. The confluence of the two liquors indicated by the numeral 22 is located very close to the end of a discharge needle 24 such as is conventionally used in artery pumping of hams. The travel distance from the confluence 22 to the discharge end 26 of the needle 24 is preferably made short.

The following two solutions for admixture using sodium hydroxide, are illustrative:

EXAMPLE 1

| Agent | Parts by Weight | |
|---|---|---|
| | Tank No. 1 | Tank No. 2 |
| Water | 829.6 | 220 |
| Sodium chloride | 176 | 9 |
| Sodium acid pyrophosphate | 30 | |
| Sodium nitrite | | 1.88 |
| Sodium nitrate | | 1.12 |
| Cane sugar | 24 | |
| Sodium erythrobate | 2.5 | |
| Sodium hydroxide | | 10 |
| Specific gravity 70° F | 1.161 | 1.080 |
| Pounds per gallon | 9.74 | 9.05 |
| Gallons in tank | 110.2 | 26.75 |
| Pounds in tank | 1,072.1 | 242 |

The two solutions are combined in the proportion of 110.2 volumes from tank No. 1 to 26.75 volumes from tank No. 2, and in quantities suitable for pumping meat to increase its weight by an amount of 12%.

These proportions effect 93% conversion of acid pyrophosphate salt to the tetra salt.

Three pairs of hams (lefts and rights of the same animal) were pumped to increase the weight by 12%. The right member of the pair was injected by the dual system using the two solutions of Example 1. The left member of the pair was injected with a single solution corresponding to the same composition but lacking the sodium acid pyrophosphate and the sodium hydroxide and using 36 parts of sodium tripolyphosphate.

The treated hams were rubbed in a conventional manner with a curing salt composition, held for five (5) days as usual, then boned, canned and cooked. The following table shows the results, L and R indicating left and right hams A, B and C:

*Table I*

Green Weight is the raw ham.
Canned Weight is the weight after processing as entered into the can.
Shrink is the percent loss based on canned weight.

| Ham | Green Weight | Canned Weight | Purge | Percent Shrink |
| --- | --- | --- | --- | --- |
| AL | 12 lbs. 4 oz | 9 lbs. 4 oz | 1 lb. 2 oz | 12.1 |
| AR | 12 lbs. 6 oz | 9 lbs. 7 oz | 1 lb. | 10.5 |
| BL | 12 lbs. 5 oz | 9 lbs. 8 oz | 1 lb. 1 oz | 11.1 |
| BR | 12 lbs. 10 oz | 10 lbs. 1 oz | 15 oz | 9.9 |
| CL | 12 lbs. 10 oz | 9 lbs. 3 oz | 1 lb. 4 oz | 13.4 |
| CR | 13 lbs. 8 oz | 10 lbs. 3 oz | 1 lb. 1 oz | 10.4 |

In each case, the purge is appreciably greater in using sodium tripolyphosphate.

EXAMPLE 2

In Example 1, the 10 parts of sodium hydroxide are replaced by 21 parts of anhydrous sodium bicarbonate ($NaHCO_3$).

EXAMPLE 3

In Example 1, the 10 parts of sodium hydroxide are replaced by 13.2 parts of anhydrous sodium carbonate ($Na_2CO_3$).

EXAMPLE 4

In Example 1, the 10 parts of sodium hydroxide are replaced by 20 parts of anhydrous trisodium phosphate ($Na_3PO_4$), and the sodium acid pyrophosphate is reduced in quantity to 15 parts, because the residue of disodium phosphate provides phosphate salt to supplement the formed tetrasodium phosphate. Thus, the resulting 90% incomplete neutralization provides in the final pickle 1.5 parts of sodium acid pyrophosphate, 16.2 parts of tetrasodium pyrophosphate, and 17.2 parts of disodium orthophosphate.

From the foregoing it is to be understood that the invention is not limited to the exemplary embodiments thereof, and that it contemplates a variety of ways to combine more than one solution at a time for producing an alkaline pickle liquor, in which a neutralizing reaction takes place during the combination, as comprehended in the appended claims.

We claim:
1. In the method of treating meat with alkaline sodium chloride pickle liquor in quantity to elevate the pH of the meat toward 7, in which method the liquor is formed substantially at the time of introducing it into the meat by combining predetermined proportions of two separate stable aqueous solutions each containing dissolved content contributing to the composition of said pickle liquor, the improvement in which a first one of said solutions contains acid alkali-metal pyrophosphate, and in which the second solution contains alkali in quantity to react with and convert at least some of said pyrophosphate salt to tetra-alkali-metal pyrophosphate, said alkali being selected from the group consisting of hydroxides, normal orthophosphates, carbonates and bicarbonates of alkali-metal, and mixtures thereof.

2. The method of claim 1 in which the amount of acid alkali-metal pyrophosphate and the amount of alkali are proportioned so that substantially all of the acid pyrophosphate salt is converted to the tetra-salt.

3. The method of claim 1 in which the amount of acid alkali-metal pyrophosphate and the amount of alkali are proportioned so that at least 90% of the acid pyrophosphate salt is converted to the tetra-salt.

4. In the method of treating meat with alkaline sodium chloride pickle liquor in quantity to elevate the pH of the meat toward 7, in which method the liquor is formed substantially at the time of introducing it into the meat by combining predetermined proportions of two separate stable aqueous solutions each containing dissolved content contributing to the composition of said pickle liquor, the improvement in which a first one of said solutions contains acid sodium pyrophosphate, and in which the second solution contains alkali in quantity to react with and convert at least some of said pyrophosphate salt to tetrasodium pyrophosphate, said alkali being selected from the group consisting of hydroxides, normal orthophosphates, carbonates and bicarbonates of sodium, and mixtures thereof.

5. The method of claim 4 in which sodium nitrite is present in said second solution.

6. The method of claim 4 in which sodium nitrite is present in said second solution and ascorbic material selected from the group consisting of isomers of ascorbic acid and water-soluble salts thereof is dissolved in said first solution.

7. The method of claim 4 in which the amount of acid sodium pyrophosphate and the amount of alkali are proportioned so that substantially all of the acid sodium pyrophosphate is converted to the tetra-salt.

8. The method of claim 4 in which the amount of acid sodium pyrophosphate and the amount of alkali are proportioned so that at least 90% of the acid sodium pyrophosphate is converted to the tetra-salt.

References Cited in the file of this patent

UNITED STATES PATENTS

| | | |
| --- | --- | --- |
| 2,513,094 | Hall | June 27, 1950 |
| 2,828,212 | Sair | Mar. 25, 1958 |
| 2,937,094 | Rupp et al. | May 17, 1960 |

FOREIGN PATENTS

| | | |
| --- | --- | --- |
| 1,098,341 | Germany | Jan. 26, 1961 |

OTHER REFERENCES

Food Technology, October 1956, pages 500 to 503, inclusive, article entitled Sodium Ascorbate in Stabilizing Cured Meat Color by R. L. Henrickson et al.